United States Patent
Sim (10) Patent No.: US 12,189,551 B2
(45) Date of Patent: Jan. 7, 2025

(54) COMPUTING SYSTEM FOR DETERMINING RESOURCE TO PERFORM OPERATION ON DATA AND OPERATING METHOD THEREOF

(71) Applicant: SK hynix Inc., Gyeonggi-do (KR)

(72) Inventor: Joon Seop Sim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 9 days.

(21) Appl. No.: 18/072,159

(22) Filed: Nov. 30, 2022

(65) Prior Publication Data

US 2024/0020252 A1 Jan. 18, 2024

(30) Foreign Application Priority Data

Jul. 15, 2022 (KR) .......................... 10-2022-0087714

(51) Int. Cl.
*G06F 13/28* (2006.01)
(52) U.S. Cl.
CPC ................................ *G06F 13/28* (2013.01)
(58) Field of Classification Search
CPC ....................................................... G06F 13/28
USPC ........................................................... 710/27
See application file for complete search history.

(56) References Cited

U.S. PATENT DOCUMENTS

| | | | | |
|---|---|---|---|---|
| 11,620,471 B2* | 4/2023 | Brock | ................ | G05B 13/0265 706/12 |
| 2013/0238572 A1* | 9/2013 | Prahlad | ............... | H04L 67/1097 707/741 |
| 2016/0162505 A1* | 6/2016 | Fallon | .................... | H04N 19/15 707/693 |
| 2017/0123687 A1* | 5/2017 | Kim | ....................... | G11C 16/32 |
| 2019/0354292 A1* | 11/2019 | O | ........................... | G06F 3/0656 |
| 2020/0401850 A1* | 12/2020 | Bazarsky | ............. | G06V 10/774 |
| 2021/0035255 A1* | 2/2021 | Nurvitadhi | ............... | G06N 3/04 |
| 2022/0197510 A1* | 6/2022 | Lee | ........................ | G06F 3/0659 |
| 2022/0197530 A1* | 6/2022 | Rhee | ........................ | G06N 3/04 |
| 2022/0357945 A1* | 11/2022 | Kaul | ...................... | G09G 5/393 |

FOREIGN PATENT DOCUMENTS

KR 10-2019-0102353 A 9/2019
KR 10-2021-0014793 A 2/2021

* cited by examiner

*Primary Examiner* — Titus Wong
(74) *Attorney, Agent, or Firm* — IP & T GROUP LLP (57) ABSTRACT

The present disclosure relates to a computing system. The computing system may include a memory system including a plurality of memory devices configured to store raw data and a near data processor (NDP) configured to receive the raw data by a first bandwidth from the plurality of memory devices and generate intermediate data by performing a first operation on the raw data, and a host device coupled to the memory system by a second bandwidth and determining a resource to perform a second operation on the intermediate data based on a bandwidth ratio and a data size ratio.

13 Claims, 8 Drawing Sheets

COMPUTING SYSTEM FOR DETERMINING RESOURCE TO PERFORM OPERATION ON DATA AND OPERATING METHOD THEREOF

CROSS-REFERENCE TO RELATED APPLICATION

The present application claims priority under 35 U.S.C. § 119 (a) to Korean patent application number 10-2022-0087714 filed on Jul. 15, 2022, the entire disclosure of which is incorporated by reference herein.

BACKGROUND

1. Field of Invention

Various embodiments of the present disclosure relate generally to an electronic device, and more particularly, to a computing system and an operating method thereof.

2. Description of Related Art

A storage device is configured to store data in response to control of a host device such as a computer or a smartphone. A storage device may include a memory device that stores data and a memory controller that controls the memory device. Memory devices may be divided into volatile memory devices and non-volatile memory devices.

A volatile memory device may retain data as long as power is being supplied, and may lose the stored data in the absence of power supply. Types of volatile memory devices may include Static Random Access Memory (SRAM), Dynamic Random Access Memory (DRAM), and the like.

A non-volatile memory device may not lose data even in the absence of power supply. Types of non-volatile memory devices may include Read Only Memory (ROM), Programmable ROM (PROM), Erasable Programmable ROM (EPROM), Electrically Erasable and Programmable ROM (EEPROM), flash memory, and the like.

SUMMARY

Various embodiments of the present disclosure are directed to a method of operating a storage device supporting improved near data processor (NDP) and a host device.

According to an embodiment of the present disclosure, a computing system may include a memory system including a plurality of memory devices configured to store raw data and a near data processor (NDP) configured to receive the raw data by a first bandwidth from the plurality of memory devices and generate intermediate data by performing a first operation on the raw data, and a host device coupled to the memory system by a second bandwidth and determining a resource to perform a second operation on the intermediate data based on a bandwidth ratio and a data size ratio.

According to an embodiment of the present disclosure, a computing system may include a plurality of memory devices configured to store first data, and a near data processor (NDP) configured to receive the first data in a first bandwidth from the plurality of memory devices and generate second data by performing a first operation on the first data, and a host device coupled to the NDP in a second bandwidth and determining whether the NDP performs a second operation based on a bandwidth ratio and a data size ratio.

According to an embodiment of the present disclosure, a method of operating a host device comprises: transferring, to a near data processor (NDP), a query to request raw data stored in a plurality of memory devices, controlling the NDP to generate first data by performing a first operation on the raw data when the NDP receives the raw data from the plurality of memory devices, and determining a resource to perform a second operation based on a data size ratio and a bandwidth ratio, the data size ratio being of a size of second data to a size of the raw data, and the bandwidth ratio being of a bandwidth between the NDP and the host device to a bandwidth between the plurality of memory devices and the NDP.

According to an embodiment of the present disclosure, an operating method of a control device may include processing first data provided from one or more memory devices through a path having a first bandwidth to generate second data and processing the second data to generate third data to be provided to a host device through a path having a second bandwidth, wherein, a bandwidth ratio is equal to or less than a data size ratio, the bandwidth ratio is of the second bandwidth to the first bandwidth, and the data size ratio is of a size of the third data to a size of the first data.

The control device may be a near data processor (NDP). For example, the operating method of the control device may be an operating method of the NDP for processing the second operation. The first data may be raw data. The second data may be intermediate data. The third data may be final data.

According to an embodiment of the present disclosure, an operating method of a host device may include requesting a control device to process first data provided from one or more memory devices through a path having a first bandwidth to generate second data and processing the second data provided from the control device through a path having a second bandwidth to generate third data, wherein, a bandwidth ratio is greater than a data size ratio, the bandwidth ratio is of the second bandwidth to the first bandwidth, and the data size ratio is of a size of the third data to a size of the first data.

For example, the operating method of the host device may be an operating method of the host device for processing the second operation.

According to an embodiment of the present disclosure, an operating method of a host device may include requesting a control device to process first data provided from one or more memory devices through a path having a first bandwidth to generate second data, requesting, when a bandwidth ratio is equal to or less than a data size ratio, the control device to process the second data to generate third data and processing, when the bandwidth ratio is greater than the data size ratio, the second data provided from the control device through a path having a second bandwidth to generate the third data, wherein, the bandwidth ratio is of the second bandwidth to the first bandwidth, and the data size ratio is of a size of the third data to a size of the first data.

For example, the operating method of the host device may be an operating method of the host device for determining the host device or a near data processor (NDP) to process the second operation.

DETAILED DESCRIPTION

Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

Figure 1:
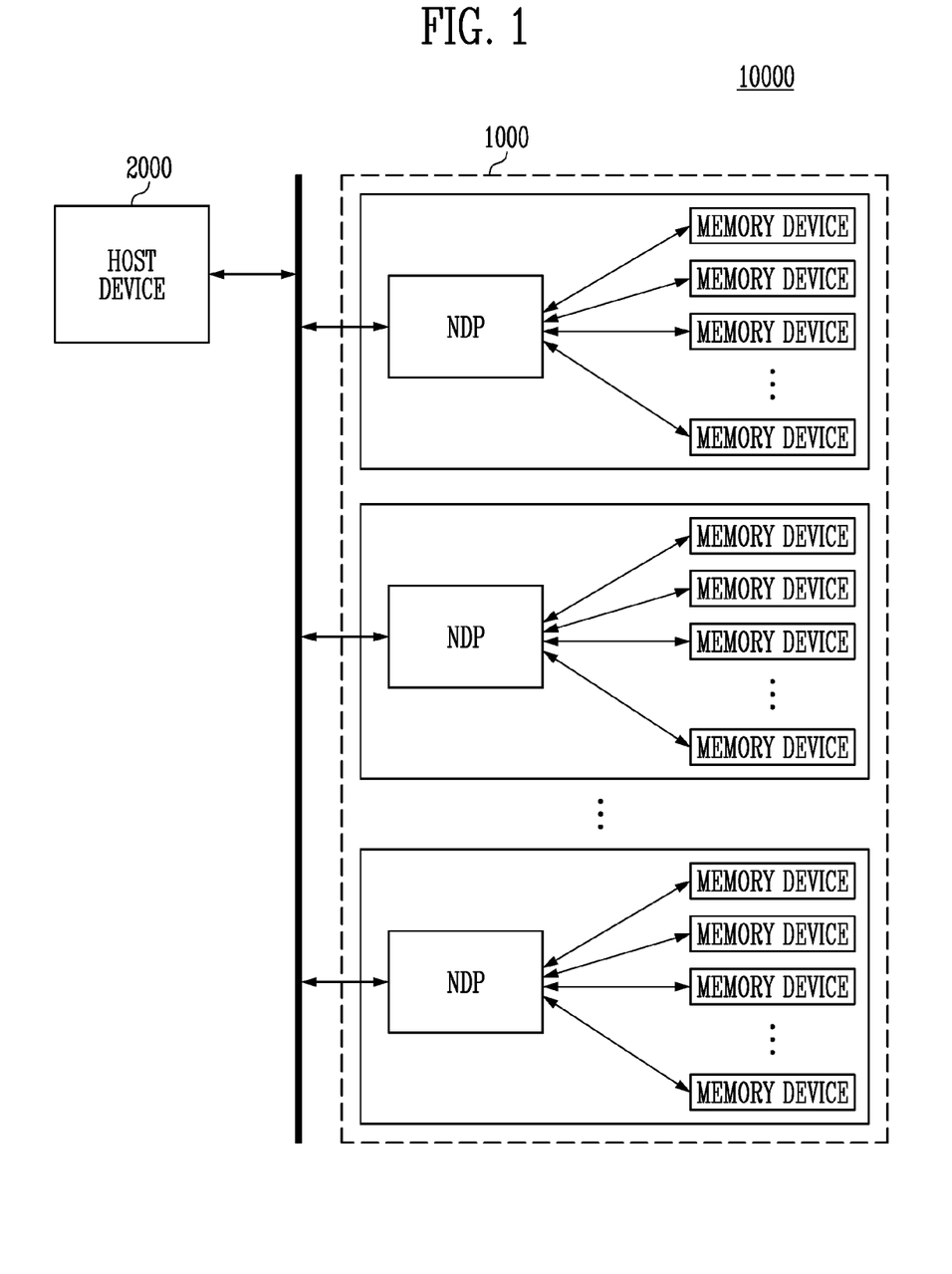
FIG. 1 is a diagram illustrating a computing system according to an embodiment of the present disclosure.

FIG. 1 is a diagram illustrating a computing system 10000 according to an embodiment of the present disclosure.

Referring to FIG. 1, the computing system 10000 may include a memory system 1000 and a host device 2000.

The memory system 1000 may be configured to store data in response to control of the host device 2000. Examples of the memory system 1000 may include a cellular phone, a smartphone, an MP3 player, a laptop computer, a desktop computer, a game player, a display, a tablet PC, and an in-vehicle infotainment system.

The memory system 1000 may be manufactured as one of various types of storage devices according to a host interface corresponding to a communication method with the host device 2000. For example, the memory system 1000 may be configured as any one of various types of storage devices such as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, and a memory stick.

The memory system 1000 may be manufactured as any of various types of packages. For example, the memory system 1000 may be manufactured in any of various package types, such as a package-on-package (POP), a system-in-package (SIP), a system-on-chip (SOC), a multi-chip package (MCP), a chip-on-board (COB), a wafer-level fabricated package (WFP), and a wafer-level stack package (WSP).

The memory system 1000 may include a deep learning-based algorithm for training and inference with high performance so as to effectively use or provide a large amount of data. However, in a deep learning-based system, since an embedding operation is performed mainly by the host device 2000, bandwidth constraints may be caused. In addition, since a large amount of service data is required, a memory capacity may become scarce.

The computing system 10000 according to an embodiment of the present disclosure may operate in response to control of the host device 2000. More specifically, the host device 2000 may include a host processor and a host memory. The host processor may include a general-purpose processor such as a CPU, an Application Processor (AP), or a Digital Signal Processor (DSP); a graphics dedicated processor, such as a Graphics Processing Unit (GPU) or a Vision Processing Unit (VPU); or an artificial intelligence dedicated processor such as a Neural-network Processing Unit (NPU). In addition, the host memory may include an operating system or an application program for providing a recommended system service.

More specifically, the host device 2000 may broadcast a query to the memory system 1000. In addition, the host device 2000 may control the memory system 1000 to acquire data corresponding to the query from the memory system 1000 by using the query. In addition, the host device 2000 may control the memory system 1000 to perform a pooling operation to generate embedding data by using the acquired data, and to provide the embedding data to the host device 2000.

According to an embodiment, the computing system 10000 may solve the lack of the memory capacity by a pooled memory architecture which may enable additional memory capacity, and may alleviate bandwidth constraints by configuring to enable near data processing (NDP).

Figure 2:
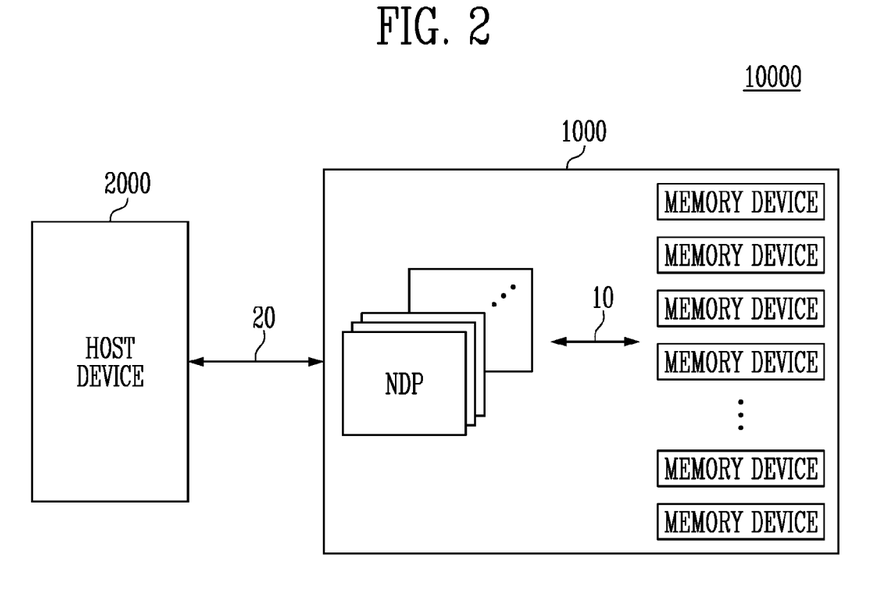
FIG. 2 is a diagram illustrating internal and external bandwidths of a memory system according to an embodiment of the present disclosure.

FIG. 2 is a diagram illustrating internal and external bandwidths of the memory system 1000 according to an embodiment of the present disclosure.

Referring to FIG. 2, a computing system 10000 which includes the memory system 1000 and the host device 2000 is briefly described. According to an embodiment of the present disclosure, the computing system 10000 may determine a resource to perform an operation on the basis of a first bandwidth 10 and a second bandwidth 20. The first bandwidth 10 may refer to the amount of data transmission between a near data processor (NDP) and a plurality of memory devices in the memory system 1000. The first bandwidth 10 may refer to the amount of data transmitted per unit time from the plurality of memory devices to the NDP. In the same manner, the second bandwidth 20 may refer to the amount of data transmission per unit time from the memory system 1000 to the host device 2000. The first bandwidth 10 and the second bandwidth 20 may be constant values which are determined depending on hardware. The host device 2000 may determine resources to perform a first operation and a second operation on raw data on the basis of the first bandwidth 10 and the second bandwidth 20.

Figure 3:
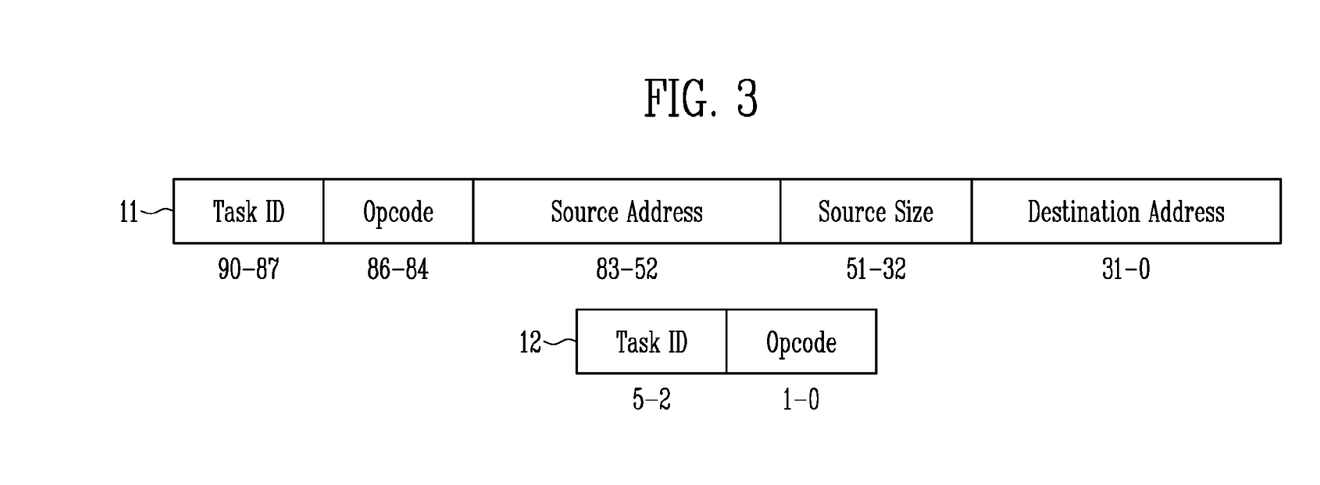
FIG. 3 is a diagram illustrating communication packets and a pre-processing operation according to an embodiment of the present disclosure.

FIG. 3 is a diagram illustrating communication packets and a pre-processing operation according to an embodiment of the present disclosure.

Referring to FIG. 3, communication packets between the host device 2000 and the memory system 1000 are shown. More specifically, a first communication packet 11 may be a message which is transferred from the host device 2000 to the memory system 1000. In addition, the first communication packet 11 may include 'Task ID', 'Opcode', 'Source Address', 'Source Size' and 'Destination Address'.

The first communication packet 11 may include 91 bits, in total, and four bits may be allocated to 'Task ID'. The 'Task ID' may indicate an operational state of the host device 2000. For example, the 'Task ID' may indicate whether an operation of the host device 2000 is running or terminated. The host device 2000 may rearrange an operation of the memory system 1000.

In addition, three bits may be allocated to the 'Opcode', and data for differentiating a plurality of embedding operations may be included in the 'Opcode'. More specifically, the host device 2000 may include the 'Opcode' to differentiate initialization, an inference operation, and a learning operation from each other. According to an embodiment, the host device 2000 may identify a type of an operation to be performed with reference to the 'Opcode'.

In addition, 32 bits may be allocated to the 'Source Address'. The memory system 1000 may include data about a source address of a query or a gradient. More specifically, the host device 2000 may include data about an address of a query or a gradient that the memory system 1000 needs to fetch from the host memory by using the 'Source Address'. The gradient may refer to data for updating the embedding table, for example, embedding data which includes a weight.

In addition, 20 bits may be allocated to the 'Source Size', and the 'Source Size' may include data about a size of a query or a gradient. In addition, the 'Destination Address' may include an address of a host memory which receives a result of performing an internal operation by the memory system 1000.

The host device 2000 may communicate with the memory system 1000 using the first communication packet 11. In addition, the memory system 1000 may transmit a second communication packet 12, which is a response message, when receiving the first communication packet 11 from the host device 2000. The second communication packet 12 may include 'Task ID' and 'Opcode'.

Figure 4:
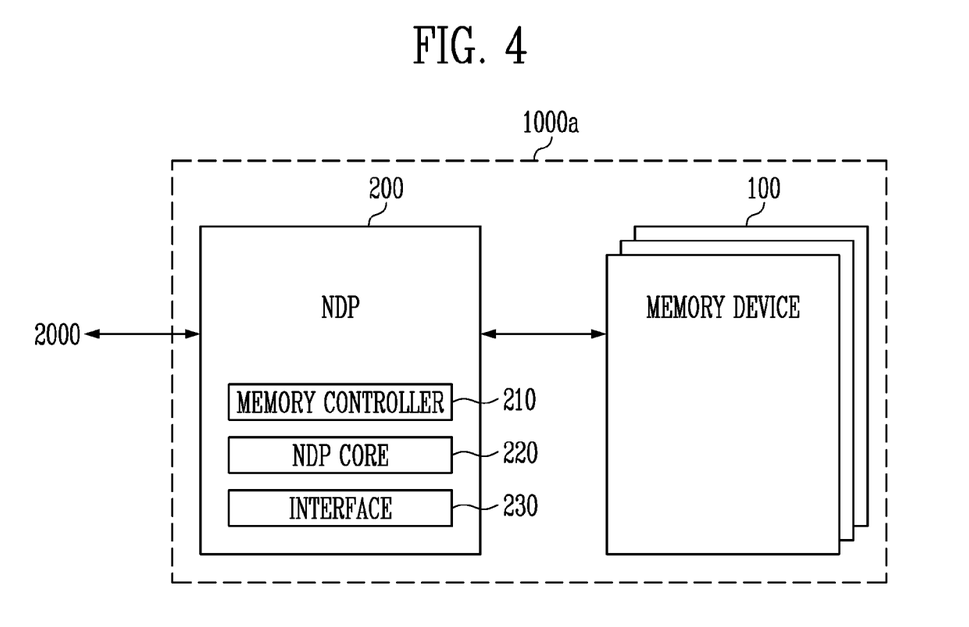
FIG. 4 is a diagram illustrating near data processing (NDP) according to an embodiment of the present disclosure.

FIG. 4 is a diagram illustrating near data processing (NDP) according to an embodiment of the present disclosure.

Referring to FIG. 4, a first memory system 1000a may include a memory device 100 and a near data processor (NDP) 200. The first memory system 1000a may be a part of the memory system 1000 as shown in FIG. 1 or FIG. 2.

The memory device 100 may store data or utilize stored data. More specifically, the memory device 100 may operate in response to control of a memory controller 210. In addition, the memory device 100 may include a plurality of memory dies, each of which may include a memory cell array including a plurality of memory cells that store data.

The memory cell array may include a plurality of memory blocks. Each of the memory blocks may include a plurality of memory cells. Each memory block may include a plurality of pages. A page may be a unit for storing data in the memory device 100, or a unit for reading data stored in the memory device 100

Examples of the memory device 100 may include Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), NAND flash memory, vertical NAND flash memory, NOR flash memory, resistive random access memory (RRAM), phase-change random access memory (PRAM), magnetoresistive random access memory (MRAM), ferroelectric random access memory (FRAM), and spin transfer torque random access memory (STT-RAM).

The memory device 100 may receive a command and an address from the memory controller 210. The memory device 100 may be configured to access an area selected in response to the received address in the memory cell array. When the memory device 100 accesses the selected area, it may mean that the memory device 100 may perform an operation corresponding to the received command on the selected area. For example, the memory device 100 may perform a write operation (program operation), a read operation and an erase operation. A program operation may refer to an operation by which the memory device 100 writes data into the area selected by the address. A read operation may refer to an operation by which the memory device 100 reads data from the area selected by the address. An erase operation may refer to an operation in which the memory device 100 erases the data stored in the area selected by the address.

The NDP 200 may control the general operations of the first memory system 1000a and perform an operation in response to a request of the host device 2000. Examples of the operation may include a pooling operation, a vector multiplication, a vector sum, and a matrix multiplication.

More specifically, the NDP 200 may include the memory controller 210, an NDP core 220, and an interface 230.

The memory controller 210 may control the memory device 100 to perform memory operations including a read operation, an erase operation, and a program operation. More specifically, the memory controller 210 may control the memory device 100 to perform a program operation, a read operation, or an erase operation in response to a request from the host device 2000. During a program operation, the memory controller 210 may provide a program command, a physical block address, and data to the memory device 100. During a read operation, the memory controller 210 may provide a read command and a physical block address to the memory device 100. During an erase operation, the memory controller 210 may provide an erase command and a physical block address to the memory device 100.

The NDP core 220 may perform an operation on data received from the memory device 100 in response to a request of the host device 2000. The NDP core 220 may include a general-purpose processor such as a CPU, an AP, or a Digital Signal Processor (DSP); a graphics dedicated processor, such as a GPU or a VPU (Vision Processing Unit); or an artificial intelligence dedicated processor such as an NPU.

The interface 230 may assist the NDP 200 in performing communication with the host device 2000. The NDP 200 may perform communication with the host device 2000 using the interface 230.

The interface 230 may include a mailbox which serves as a communicator when data is moved between the NDP 200 and the host device 2000. In addition, the interface 230 may include a generic interrupt controller (GIC) which handles an interrupt between the NDP 200 and the host device 2000. In addition, the interface 230 may include a direct memory access (DMA) which allows data to be transferred to a memory of the host device 2000 or the memory device 100 without intervention of the processor including the NDP core 220. The interface 230 may be connected to the host device 2000 by PCIe and include a protocol to perform communication using the PCIe.

According to an embodiment, the NDP core 220 may perform an entirety of, or a portion of operations of data required by the computing system 10000. For example, the NDP core 220 may generate intermediate data by performing an operation on the raw data stored in the memory device 100. In addition, the NDP core 220 may generate the final data by performing an operation on the intermediate data. An operation to be performed by the NDP core 220 may be determined in response to control of the host device 2000.

Figure 5:
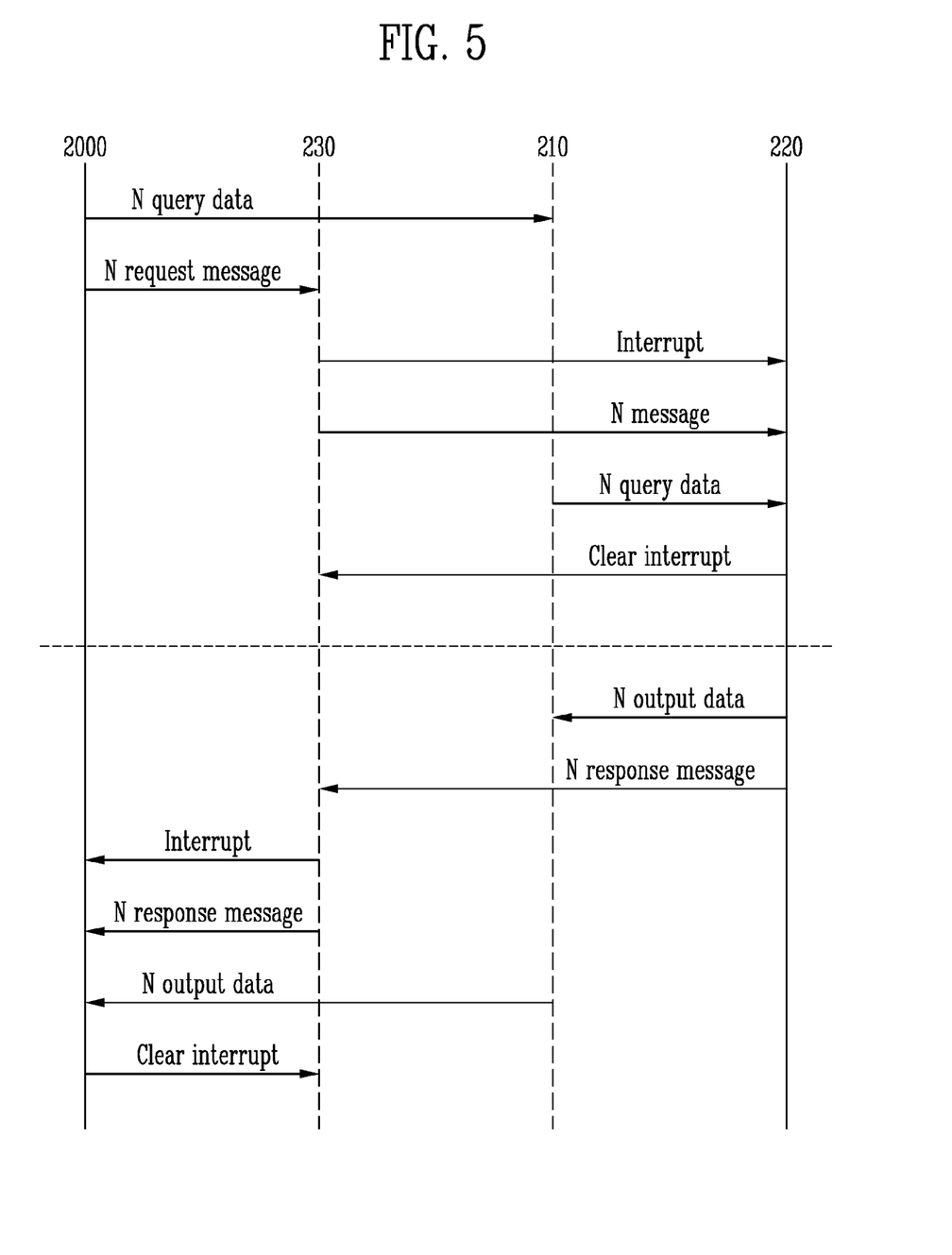
FIG. 5 is a diagram illustrating an interface operation according to an embodiment of the present disclosure.

FIG. 5 is a diagram illustrating an interface operation according to an embodiment of the present disclosure.

Referring to FIG. 5, the NDP 200 may perform an interface operation with the host device 2000.

First, the NDP 200 may receive a request to perform an operation on predetermined data (e.g., N query data) from the host device 2000. More specifically, the memory controller 210 may receive the predetermined data (e.g., N query data) from the host device 2000, and the interface 230 may receive a request message to process the predetermined data from the host device 2000.

In addition, the NDP 200 may transfer an interrupt to the NDP core 220 by using the interface 230. When the NDP core 220 receives the interrupt from the interface 230, the NDP core 220 may read out the request message and the predetermined data (e.g., N query data) which the interface 230 and the memory controller 210 receive from the host device 2000.

In addition, when the NDP core 220 completely reads the request message and the predetermined data (e.g., N query data) from the interface 230 and the memory controller 210, the NDP core 220 may notify the interface 230 that the request message and the predetermined data are completely read.

In addition, the NDP core 220 may perform an operation on the predetermined data (e.g., N query data), transfer the predetermined data (e.g., N output data) on which the operation has been performed, and transmit a response message (e.g., N response message), which indicates that the operation has been completed, to the interface 230.

When the interface 230 receives the response message (e.g., N response message) from the NDP core 220, the interface 230 may transfer the interrupt and the response message to the host device 2000. In addition, the memory controller 210 may transfer the predetermined data (e.g., N output data) on which the operation has been performed to the host device 2000.

In addition, when the host device 2000 completely receives the response message (e.g., N response message) and the predetermined data (e.g., N output data), the host device 2000 may notify the interface 230 that the reception of the response message (e.g., N response message) and the predetermined data (e.g., N output data) has been completed.

Figure 6:
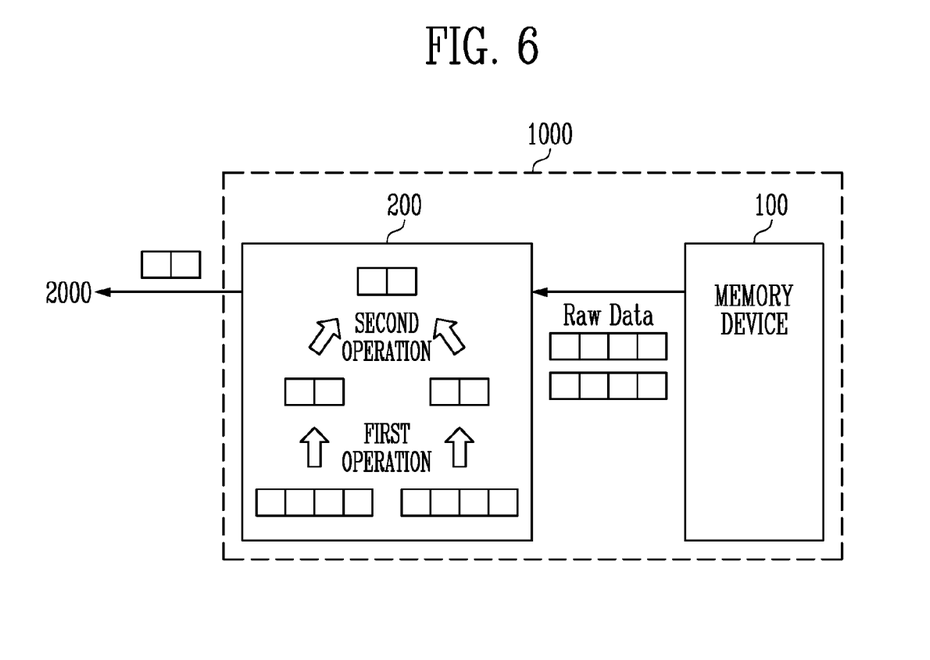
FIG. 6 is a diagram illustrating a first embodiment according to the present disclosure.

FIG. 6 is a diagram illustrating a first embodiment according to the present disclosure.

Referring to FIG. 6, according to an embodiment, the NDP 200 may perform a first operation and a second operation.

The host device 2000 may control the NDP 200 to perform a first operation and a second operation. More specifically, the host device 2000 may control the NDP 200 to perform the first operation and the second operation on the basis of a bandwidth ratio and a data size ratio. The bandwidth ratio may refer to a ratio of a second bandwidth of the NDP 200 and the host device 2000 to a first bandwidth of the memory device 100 and the NDP 200. In addition, the data size ratio may refer to a ratio of the size of the final data to raw data. The first operation may be a processing operation to generate first data. The second operation may be a processing operation to generate second data. The NDP 200 may generate the second data by performing the first operation and the second operation on the raw data.

According to the first embodiment of the present disclosure, when the band ratio is smaller than or equal to the data size ratio, the host device 2000 may control the NDP 200 to perform the second operation. In addition, the NDP 200 may generate the second data (or the final data) by performing the second operation on the first data (or intermediate data), and may transfer the final data to the host device 2000.

Figure 7:
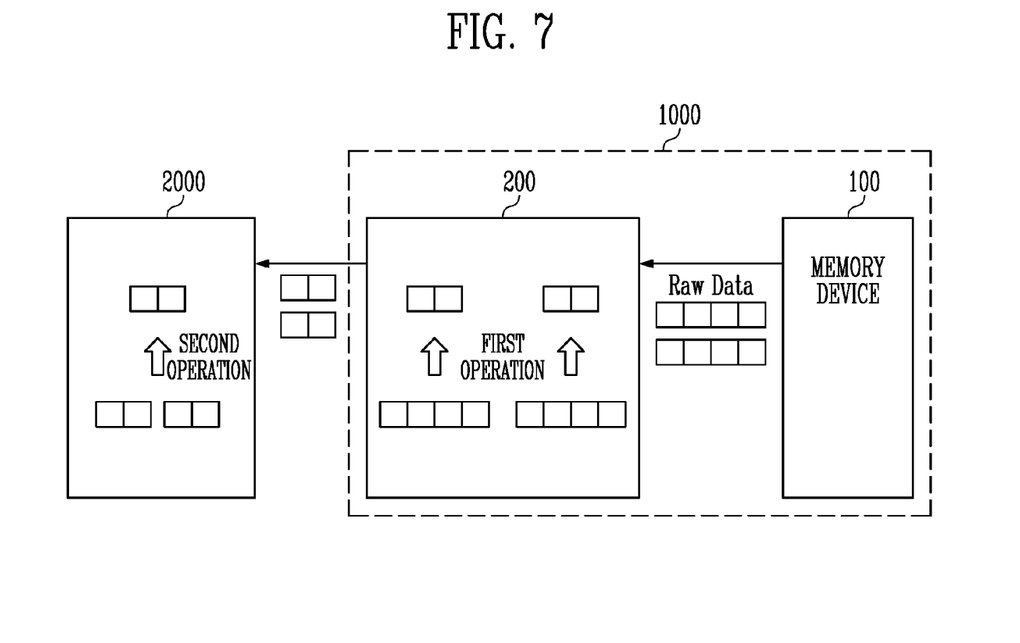
FIG. 7 is a diagram illustrating a second embodiment according to the present disclosure.

FIG. 7 is a diagram illustrating a second embodiment according to an embodiment of the present disclosure.

Referring to FIG. 7, according to an embodiment, the NDP 200 may perform a first operation and the host device 2000 may perform a second operation.

The host device 2000 may control the NDP 200 to perform the first operation, and the host device 2000 may perform the second operation. More specifically, the host device 2000 may control the NDP 200 such that the first operation is performed by the NDP 200 on the basis of a bandwidth ratio and a data size ratio. In addition, the host device 2000 may perform the second operation on first data received from the NDP 200. The NDP 200 may generate the first data by performing the first operation on the raw data, and the host device 2000 may generate second data by performing the second operation on the first data.

According to the second embodiment of the present disclosure, when the bandwidth ratio is greater than the data size ratio, the host device 2000 may control the memory system 1000 such that the second operation may be performed by the host device 2000. The host device 2000 may control the memory system 1000 to perform the first operation only by the memory system 1000. The NDP 200 may generate the first data (or intermediate data) by performing the first operation on the raw data and transfer the intermediate data to the host device 2000. The host device 2000 may generate second data (or final data) by performing the second operation on the first data (or intermediate data).

Figure 8:
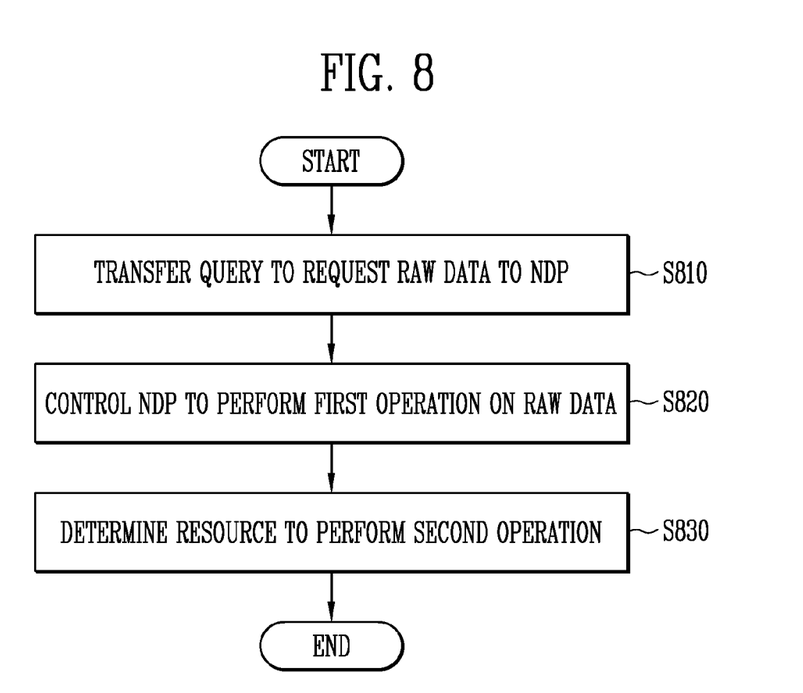
FIG. 8 is a diagram illustrating a method of operating a host device according to an embodiment of the present disclosure.

FIG. 8 is a diagram illustrating a method of operating the host device 2000 according to an embodiment of the present disclosure.

Referring to FIG. 8, the host device 2000 may transfer a query to request raw data to the NDP 200 at operation S810. More specifically, the host device 2000 may transfer the query to request the raw data stored in the plurality of memory devices 100 to the NDP 200.

In addition, the host device 2000 may control the NDP 200 to perform a first operation on the raw data at operation S820. More specifically, when the NDP 200 receives the raw data from the plurality of memory devices 100, the host device 2000 may control the NDP 200 to generate the first data by performing the first operation on the raw data.

In addition, the host device 2000 may determine a resource to perform a second operation S830. More specifically, based on a ratio of a size of second data to a size of the raw data and a ratio of a bandwidth between the NDP 200 and the host device 2000 to a bandwidth between the plurality of memory devices 100 and the NDP 200, the host device 2000 may determine the resource to perform the second operation. That is, the host device 2000 may determine the resource to perform the second operation by comparing the data size ratio and the bandwidth ratio. The second data may be generated by performing the second operation on the first data. When the bandwidth ratio is greater than the data size ratio, the host device 2000 may determine the host device 2000 as the resource to perform the second operation. In addition, when the bandwidth ratio is smaller than or equal to the data size ratio, the host device 2000 may determine the NDP 200 as the resource to perform the second operation. After the host device 2000 determines the NDP 200 as the resource to perform the second operation, the host device 2000 may receive the second data from the NDP 200.

Figure 9:
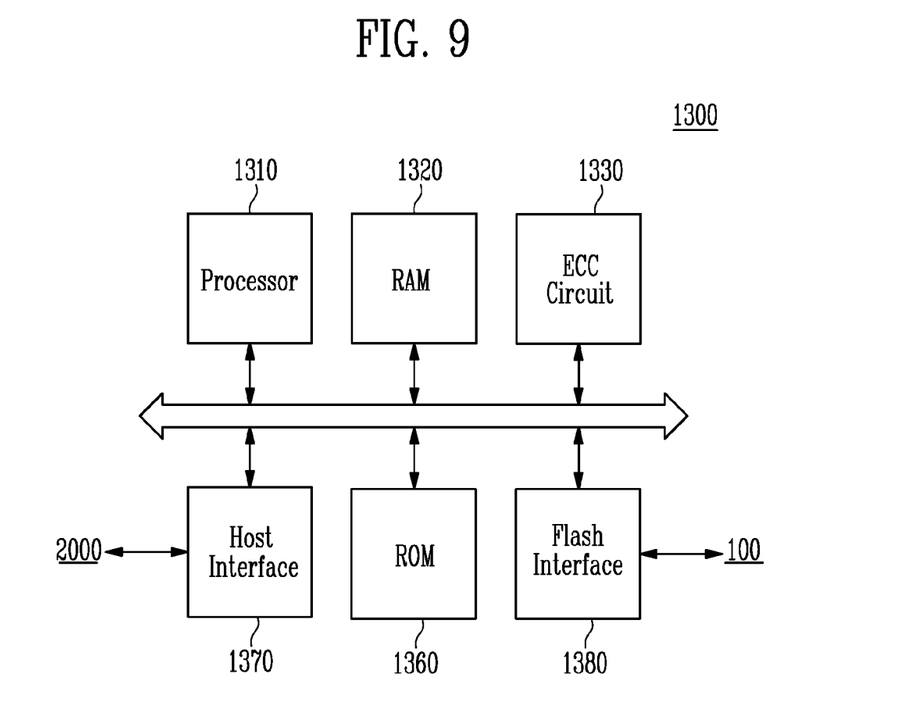
FIG. 9 is a diagram illustrating a memory controller according to an embodiment of the present disclosure.

FIG. 9 is a diagram illustrating a memory controller 1300 according to an embodiment of the present disclosure.

Referring to FIG. 9, the memory controller 1300 may include a processor 1310, a RAM 1320, an error correction circuit 1330, a ROM 1360, a host interface 1370, and a flash interface 1380. The memory controller 1300 as shown in FIG. 9 may correspond to an embodiment of the memory controller 210 as shown in FIG. 4.

The processor 1310 may communicate with the host device 2000 using the host interface 1370 and perform a logical operation to control operations of the memory controller 1300. For example, the processor 1310 may load program commands, data files, data structures, etc. based on a request from the host 2000 or an external device, and may perform various types of operations, or generate commands or addresses. For example, the processor 1310 may generate various commands for a program operation, a read operation, an erase operation, a suspend operation, and a parameter setting operation.

In addition, the processor 1310 may function as a flash translation layer FTL. The processor 1310 may translate a logical block address LBA provided by the host device 2000 into a physical block address PBA through the flash translation layer FTL. The flash translation layer FTL may receive the logical block address LBA and translate the logical block address LBA into the physical block address PBA by using a mapping table. There may be various address mapping methods of the flash translation layer FTL, based on a mapping unit. Typical address mapping methods may include a page mapping method, a block mapping method, and a hybrid mapping method.

In addition, the processor 1310 may generate a command without a request from the host device 2000. For example, the processor 1310 may generate a command for background operations such as wear leveling operations of the memory device 100 and garbage collection operations of the memory device 100.

The RAM 1320 may serve as an operation memory, a cache memory or a buffer memory of the processor 1310. The RAM 1320 may store codes and commands executed by the processor 1310. The RAM 1320 may store data which is processed by the processor 1310. In addition, the RAM 1320 may be realized with static RAM (SRAM) or dynamic RAM (DRAM).

The error correction circuit 1330 may detect errors during a program operation or a read operation and correct the detected errors. More specifically, the error correction circuit 1330 may perform an error correction operation according to an error correction code (ECC). In addition, the error correction circuit 1330 may perform ECC encoding based on data to be written to the memory device 100. The ECC-encoded data may be transferred to the memory device 100 through the flash interface 1380. In addition, the error correction circuit 1330 may perform ECC decoding based on data received from the memory device 100 through the flash interface 1380.

The ROM 1360 may serve as a storage unit which stores various types of information for operations of the memory controller 1300. More specifically, the ROM 1360 may include a map table, and the map table may include physical-logical address information and logical-physical address information. The ROM 1360 may be controlled by the processor 1310.

The host interface 1370 may include a protocol for data exchange between the host device 2000 and the memory controller 1300. More specifically, the host interface 1370 may communicate with the host device 2000 through one or more various communication standards or interfaces such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, a private protocol, etc.

The processor 1310 may control the flash interface 1380 to communicate with the memory device 100 using a communication protocol. More specifically, the flash interface 1380 may perform communication with the memory device 100 for commands, addresses, and data through a channel. For example, the flash interface 1380 may include a NAND interface.

According to the present disclosure, a method of operating a storage device supporting improved near data processing (NDP) and a host device is provided.

While the present teachings have been illustrated and described with respect to specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A computing system comprising:
    a memory system including:
        a plurality of memory devices configured to store raw data; and
        a near data processor (NDP) configured to receive the raw data by a first bandwidth from the plurality of memory devices and generate intermediate data by performing a first operation on the raw data; and
    a host device coupled to the memory system by a second bandwidth and configured to:
    compare a bandwidth ratio, which is a ratio of the second bandwidth to the first bandwidth, with a data size ratio, which is a ratio of a) a size of final data generated by performing in the memory system a second operation on the intermediate data to b) a size of the raw data, and
    after comparison of the bandwidth ratio with the data size ratio, determine one between the host device and the NDP as a resource to perform the second operation on the intermediate data based on a result of comparing the bandwidth ratio with the data size ratio.

2. The computing system of claim 1, further comprising a comparator configured to calculate each of the bandwidth ratio and the data size ratio, and compare the bandwidth ratio and the data size ratio with each other.

3. The computing system of claim 1, wherein when the bandwidth ratio is greater than the data size ratio, the host device further controls the memory system such that the second operation is performed by the host device.

4. The computing system of claim 3,
    wherein the memory system further transfers the intermediate data to the host device, and
    wherein the host device further performs the second operation on the intermediate data when the host device receives the intermediate data from the memory system.

5. The computing system of claim 1, wherein when the bandwidth ratio is smaller than or equal to the data size ratio, the host device further controls the memory system such that the second operation is performed by the NDP.

6. The computing system of claim 5, wherein the NDP further generates the final data and further transfers the final data to the host device.

7. The computing system of claim 1, wherein the NDP comprises:
   a memory controller configured to control the memory device to perform a memory operation including a read operation, an erase operation, and a program operation; and
   an NDP core configured to perform a processing operation including the first operation on the raw data received from the memory device.

8. A computing system comprising:
   a plurality of memory devices configured to store first data;
   a near data processor (NDP) configured to receive the first data in a first bandwidth from the plurality of memory devices and generate second data by performing a first operation on the first data; and
   a host device coupled to the NDP in a second bandwidth and configured to:
   compare a bandwidth ratio, which is a ratio of the second bandwidth to the first bandwidth, with a data size ratio, which is a ratio of a) a size of third data generated by performing in the memory system a second operation on the second data to b) a size of the first data, and
   after comparison of the bandwidth ratio with the data size ratio, determine one between the host device and the NDP as a resource to perform the second operation based on a result of comparing the bandwidth ratio with the data size ratio.

9. The computing system of claim 8, wherein when the bandwidth ratio is greater than the data size ratio, the host device further controls the NDP such that the second operation is performed by the host device.

10. The computing system of claim 9,
    wherein the NDP further transfers the second data to the host device, and
    wherein the host device further performs the second operation on the second data when the host device receives the second data from the NDP.

11. The computing system of claim 8, wherein when the bandwidth ratio is smaller than or equal to the data size ratio, the host device further controls the NDP such that the second operation is performed by the NDP.

12. The computing system of claim 11, wherein the NDP further generates the third data and further transfers the third data to the host device.

13. The computing system of claim 8, wherein the NDP comprises:
    a memory controller configured to control the memory device to perform a memory operation including a read operation, an erase operation, and a program operation; and
    an NDP core configured to perform a processing operation including the first operation on the first data received from the memory device.

* * * * *